United States Patent Office 3,379,673
Patented Apr. 23, 1968

3,379,673
PIGMENTED COMPOSITIONS AND METHOD
OF MANUFACTURE
Raymond P. Rossman, Wellesley Hills, Merrill E. Jordan, Walpole, and Eli M. Dannenberg, Waban, Mass., assignors to Cabot Corporation, Boston, Mass., a corporation of Delaware
No Drawing. Continuation-in-part of application Ser. No. 637,621, Feb. 1, 1957. This application Feb. 28, 1963, Ser. No. 261,815
6 Claims. (Cl. 260—41)

This invention relates to carbon black-filled plastomeric compositions especially those based upon substantially saturated hydrocarbon polymers of the olefin type, such as polyethylene. More particularly, it relates to such compositions containing carbon blacks which have been modified in such a way as to eliminate their normal tendency to cause bubble formation in such plastomeric compositions upon being subjected to heat processing under pressures not substantially above atmospheric. This application is a continuation in part of our application Ser. No. 637,621, filed Feb. 1, 1957, now abandoned.

The improvements realized by the use of carbon black as a reinforcing filler or as a pigment when incorporated into various natural and synthetic polymers are so well known that they need not be enumerated herein in any great detail. In general, the improvements realized are obtained by intimately dispersing the carbon black with the polymeric material(s) under conditions of high shear such as are generated by two roll mills, etc. Thereafter, the filled composition is molded or extruded into the final shape or form desired, and, in some processes, at the same time cured or vulcanized, if required, to impart an improved degree of stabilization to the form of the ultimate article.

In the field of carbon black filled polyethylene and other polyolefin plastics, the common tendency of such compositions to bubble when they are heat processed at normal atmospheric pressures or thereabout has been a serious and continuing problem with which the manufacturer of extruded articles, wire and cable coatings or low pressure molded goods has had to contend. In fact, this problem has been so severe that attempts to predry the black, or even the complete finished black-filled compound, just before use have not been completely successful.

Although the problem described above is inherent in many carbon black-filled polymeric compositions, its intensity will depend generally upon the nature and amount of black utilized, the nature of the equipment used in forming the final article and to a certain degree, upon the particular polymeric material utilized. For example, as disclosed in our above-mentioned copending application the problem is especially apparent when the finer particle sized carbon blacks, such as those used to protect against ultraviolet degradation, are used in polyolefin compositions. It is well known that carbon black-filled polyolefin compositions, especially carbon black-filled polyethylene compositions, are useful as coatings for wire as well as a material of fabrication for pipe, rod, etc. Generally, for such applications, the carbon black is dispersed in the polymer by compounding the ingredients in a Banbury and/or on a two roll mill at elevated temperatures, e.g., from about 200° F. to 300° F. or somewhat higher. After compounding, the composition is cooled, and generally cut up into small pellets and stored for delivery to the fabricator. When such pellets are later heated to forming temperatures considerable bubbling generally occurs especially as the article is being extruded in its final form. Thus, the final article contains serious surface defects and areas within the cross-section of the final article which are lacking in strength and integrity.

Those well skilled in the art generally attribute the above-mentioned bubbling and attendant problems to the evolution of moisture which has been absorbed by the black during the interval between the compounding of the black-filled composition and the ultimate use thereof. One method of solving this problem is disclosed in our aforementioned copending application wherein we discovered that the bubbling problem may be virtually eliminated when black-filled polyethylene compositions are cured at atmospheric pressure by selecting certain specialized blacks as fillers therefor. In our copending application, we discovered that certain blacks do not appear to absorb moisture to any applicable extent or at least do not permit excessive evolution of absorbed moisture when incorporated in the polymeric systems of interest. These blacks include acetylene blacks, thermal blacks, and furnace blacks having a particle diameter above a certain minimum limit but which have been calcined. In accordance with our continuing efforts to solve this problem we have found that a particular sub-class of the above-mentioned blacks offers surprising additional advantages when utilized in polymeric compositions, since their use also improves the processability of such compounds and thus permits the production of smooth surfaced, black filled, polymeric articles having superior color and strength, etc.

The principal object of the present invention is to provide a carbon black of good color properties which has low moisture absorption properties and which at the same time is readily dispersible in most polymeric materials.

Another object of the present invention is to provide a high color carbon black of improved processability properties because of the low moisture absorption properties thereof and because of the ease of dispersion thereof in polymeric materials.

Still another object of the present invention is to provide a black of improved processability properties which is considerably less expensive than, but which nevertheless is an effective substitute for, certain blacks presently utilized in particular polymeric materials, especially in polyolefinic materials.

Another object of the present invention is to provide an inexpensive black of improved processability properties which also is free of undesirable extractible materials.

Still other objects and advantages of the present invention will in part be apparent to those skilled in the art or will in part appear hereinafter.

The above objects and advantages are realized in accordance with the teachings of the present invention by utilizing as a filler or pigment in any of the diverse polymeric materials, an oil furnace carbon black which has been heated in the absence of substantial amounts of air at temperatures above about 500° C. and preferably at temperatures above about 800° C. Although almost any furnace black may be treated in accordance with the teachings of our invention, nevertheless the product having the best combination of processability properties is obtained when the black involved is a high structure oil furnace black.

The term, "high structure" is difficult to define since "structure" is a primary property of black which is not strictly influenced consistently by any property or combination of properties thereof. However, "high structure" carbon blacks are characterized by certain peculiar properties which distinguish them from other oil furnace blacks. The primary characteristic of a high structure black is best observed by electron microscope examination of the blacks which reveal a high degree of aggregation of the primary particles thereof into chain-like structures. However, since all oil furnace blacks manifest a degree of aggregation of the primary particles, high structure oil furnace blacks are further characterized by higher conductivities and more especially by higher oil absorption factors for a given particle diameter. In order to illustrate more clearly what we mean by "high structure" blacks, the following table is presented. The table describes the properties of some of the oil furnace carbon blacks produced by Cabot Carporation. For the purposes of the present invention, the term, "high structure" includes those oil furnace blacks which have a ratio of oil absorption to average electron microscope particle diameter greater than about 5.0 and preferably greater than about 5.5.

TABLE I

| Black | Average Electron Microscope Part. Diam., millimicrons | Oil Absorption, lbs. oil/ 100 lbs. blk. | Ratio OA/ Part. Diam. |
|---|---|---|---|
| Vulcan SC (SCF) | 21 | 130 | 6.2 |
| Vulcan C (CF) | 23 | 132 | 5.74 |
| Vulcan XC-72 (ECF) | 29 | 250/225 | 8.61/7.76 |
| M-843 (ISAF) | 22 | 156 | 7.09 |
| Vulcan 9 (SAF) | 20 | 115 | 5.72 |
| Vulcan 6 (ISAF) | 23 | 125 | 5.42 |
| Vulcan 3 (HAF) | 29 | 135/125 | 4.66/4.30 |
| Regal 600 | 23 | 80 | 3.49 |
| Regal 300 | 26 | 90 | 3.46 |

It will be obvious from the above table that the oil furnace blacks of interest to the present invention are those having properties as follows: an average electron microscope particle diameter between about 20 to 30 millimicrons, an oil absorption factor of between about 110 to about 250 pounds of oil per hundred pounds of black, and nitrogen surface area between about 110 to about 220 square meters per gram. It is to be understood that included within that class of blacks which we designate as high structure blacks are many blacks which relative to others in the class will be regarded as super high structure blacks and these are most preferred for the practice of our invention. Besides displaying a more pronounced tendency to form chain-like structures, the super high structure blacks are very highly conductive and also have higher surface areas, lower particle diameters and higher oil absorption factors for a given particle diameter. Generally, these blacks which represent the most strongly preferred embodiment of our invention include those known to the art as S.A.F. (Super Abrasion Furnace), I.S.A.F. (Intermediate Super Abrasion Furnace) and C.F. (Conductive Furnace) including S.C.F. (Super Conductive Furnace) and E.C.F. (Extra Conductive Furnace).

The temperatures at which any of the above-mentioned furnace blacks should be treated or calcined is one of the critical features of our invention. Although a degree of improvement in the performance of the blacks in polymeric compositions is noted when the blacks are heated to temperatures above about 500° C. in the absence of any substantial amounts of air or molecular oxygen for about 60 minutes, nevertheless the most significant degree of improvement is obtained when the blacks are heated to temperatures between about 800° C. and about 1500° C. or somewhat higher for a time between about 30 minutes to about 5 hours in the absence of any substantial amounts of reactive gases. Longer times may be utilized, if desired, but for practical purposes little benefit is to be derived therefrom.

Many processes together with apparatus useful for effectuating same may be utilized in the heating or calcining step involved in the production of the blacks which we have found to be especially advantageous. For example, conventional heating equipment such as induction heaters, electric furnaces, etc., may be utilized in accordance with manners known to the art to accomplish the heating of the blacks. The treatment may be accomplished in a batch type manner or in a continuous fashion. Most preferably, however, the black is calcined while in a fluidized state. For example, the black may be suspended in an inert gas, and the aerosol conducted through a high temperature calcination zone. By "inert" gas we mean one that is essentially free of highly reactive components such as molecular oxygen, and, at the higher temperatures, species like $CO_2$ or $H_2O$, except in nominal amounts.

Many surprising advantages are to be obtained by utilizing those blacks conditioned in accordance with the teachings of our invention. For example, not only is bubbling virtually eliminated but also, quite surprisingly, when the high structure blacks are involved, the high temperature conditioning treatment does not impair the dispersibility of the blacks in most polymeric materials to any great extent as would be normally expected. Accordingly, the practice of our invention permits the blacks to better impart their pigmenting or reinforcing properties to the polymeric material in which they are incorporated. Moreover, by conditioning the blacks to minimize the subsequent absorption of moisture, such moisture is obviously not available to interfere with the activity of curing systems if such are utilized for the polymeric material involved. Another incidental advantage to be realized from the practice of our invention, which is important for certain applications, is that the high temperature conditioning step evidently removes substantially all of the extractible material originally associated with the black and such conditioned blacks meet the Federal Drug Administration standards in this respect.

It is to be understood that all of the advantages noted above are especially to be realized in the production of the final article of manufacture when the so treated high structure blacks are introduced into any polymeric material which is utlimately formed into its final shape at atmospheric pressure. Accordingly, for the purposes of the present invention the term, "polymeric material" broadly includes the synthetic elastomeric and the plastomeric polymeric materials known to the art to be compatible with carbon black. Especially included in the term, however, and representing the preferred embodiment of this invention are the substantially saturated polymers of the $\alpha$-monoolefins such as polyethylene, polypropylene, polybutene and the polymers of the higher homologues of this class and copolymers of these monomers and mixtures thereof. As stated, the problem of bubbling is especially serious in such polymers when filled with conventional carbon blacks. Evidently, however, when the calcined carbon blacks of the present invention are incorporated into such polymers, the black is either unable to absorb large amounts of moisture or at least does not release significant amounts thereof during the extrusion step involved which would impair the ultimate appearance and strength of the final article. It is also to be understood that the above advantages are to be realized in the final article whether or not the polymeric composition also contains chemical curing agents which are subsequently activated in order to impart improved stabilization to the final form of the article.

The folowing example illustrating some of the preferred modes of practicing our invention is offered that those well skilled in the art may better understand and practice same. It is to be understood that this example is illustrative in nature and in no way is to be construed so as to limit our invention beyond those limits expressly set forth in the present specification and in the appended claims.

In heating blacks above 800° C.; 2 lbs. of the black were heated in a nitrogen atmosphere at the temperature involved for 120 minutes in an induction furnace.

In heating blacks from 500° C. to 800° C.; 2 lbs. of black were heated in a nitrogen atmopshere at the temperature involved in a rotary, gas fired calciner.

Example 1

Samples of each of the following oil furnace blacks were heated to 500° C., 800° C., and 1000° C.

M-843 is a super-high structure oil furnace black of ISAF grade produced by Cabot Corporation and has a nitrogen surface area of about 116 square meters/ gram, an average electron microscope particle diameter of about 22 millimicrons, an oil absorption factor of about 156 lbs. of black/100 lbs. oil black.

Vulcan 6 is an ISAF oil furnace black of lower structure than M-843, Vulcan 6 is produced by Cabot Corporation and has a nitrogen surface area of about 115 square meters/gram, an average electron microscope particle diameter of about 23 millimicrons, an oil absorption factor of about 125 lbs. oil/100 lbs. of black and a nigrometer scale of 88.

Regal 600 is a low structure oil furnace black produced by Cabot Corporation and has a nitrogen surface area of about 84 square meters/gram, an average electron microscope particle diameter of 26 millimicrons, an oil absorption factor of about 90 lbs. oil/100 lbs. of black and a nigrometer scale of 86.

Each of the above blacks were incorporated into polyethylene (Du Pont's Alathon 10) on a two roll mill to produce a 25% black filled polyethylene masterbatch composition. The degree of dispersion obtained with each black was evaluated with a microscopic examination of smear-outs of all the masterbatches at low and high magnifications. Also, masstone color comparisons were made by simultaneous spot squeeze-outs. Masstone color is a property which is generally related to dispersion. The following data were obtained:

TABLE II.—EVALUATION OF DISPERSIONS OF HEAT-TREATED BLACKS (25% IN ALATHON 10)

| No. | Compound Identification, Black | Dispersions on Large Mill |
|---|---|---|
| P-703 | M-843 (Control) | Excellent. |
| P-704 | M-843 (500° C.) | Very good. |
| P-705 | M-843 (1,000° C.) | Do. |
| P-717 | Vul. 6 (500° C.) | Do. |
| P-718 | Vul. 6 (1,000° C.) | Do. |
| P-719 | Reg. 600 (500° C.) | Poor. |
| P-720 | Reg. 600 (1,000° C.) | Very poor. |

TABLE III.—MASSTONE COLOR COMPARISON OF POLYETHYLENE COMPOUNDS

Comparison of blacks:
M-843 (1000° C.)____ Darkest by far.
Vul 6 (1000° C.)_____ Medium—lighter than M-843.
Reg. 600 (1000° C.)___ Very light and brown.

It will be obvious from Tables II and III that the super-high structure blacks, e.g. M-843, when heat-treated even at higher temperatures are most easily dispersed into polyethylene and produce darker polymeric compositions than other oil furnace blacks and even other high-structure blacks. Thus, the super-high structure furnace blacks represent the preferred embodiment of our invention since upon being heated or calcined, their resultant properties especially recommend them as pigments and fillers of superior processability properties.

The remainder of each masterbatch was cut into small rectangles and the weight of each determined after being vacuum dried to constant weight. The rectangles were then placed in a desiccator wherein the relative humidity was maintained at 79%. The amount of moisture absorbed was determined by weighing the rectangles at varying times throughout a period of 30 days. The bubbling characteristics were determined by visual examination of the rectangles after they had been heated on a hot plate for 5 minutes to a temperature of 450° F.

The following data were obtained:

TABLE IV.—MOISTURE ADSORPTION AND DEGREE OF BUBBLING OF POLYETHYLENE COMPOUNDS

[Moisture adsorbed by compound (wt. gain/dry compound wt.×100) and degree of bubbling]

| | 1 Day at 79% RH | 6 Days at 79% RH | 25 days at 79% RH |
|---|---|---|---|
| P-703 M-843 Control | .086 (very slight) | .281 (severe) | .587 (very severe). |
| P-705 M-843 1,000° C | .059 (none) | .110 (medium) | .247 (severe). |

TABLE V.—DEGREE OF BUBBLING OF COMPODSNU ROOM CONDITIONED FOR ONE MONTH

| P-703 | M-843 Control | Very Severe. |
|---|---|---|
| P-705 | M-843 1,000° C | Very Slight. |
| P-720 | Vul. 6 Control | Very Severe. |
| P-718 | Vul. 6 1,000° C | Very Slight. |

It will be obvious from the above data that the blacks of the present invention have reduced moisture absorption properties and hence serious bubbling problems may be avoided even when the compounds are stored for longer periods of time. Accordingly, our blacks have desirable processability properties which are especially reflected when the black-filled polymeric material is extruded at atmospheric pressure. The improvements obtained with our blacks are realized when either low or high loadings thereof are involved. Accordingly, our blacks may represent from about 1% by weight to about 70% by weight of the final product. We have found, however, that their use is particularly advantageous when loadings from about 2 to about 10% are involved such as are present in plastomeric compositions useful as coatings for wire, etc.

Since the essence of our invention resides in the discovery that furnace blacks and especially high modulus furnace blacks which have been calcined have surprisingly improved processability properties especially when utilized in polymeric materials which are extruded and/or cured at atmospheric pressure, many modifications of the incidental features useful in producing and utilizing same are contemplated within the scope of our invention.

Having disclosed our invention together with preferred embodiments thereof what we declare as new and desire to secure by U.S. Letters Patents is as follows:

1. A process for making superior articles from carbon black-filled polymeric compositions without the necessity for processing same at pressures substantially above atmospheric which comprises dispersing in a polymeric substance chosen from the group consisting of polyethylene, polypropylene, polybutene, copolymers thereof and mixtures thereof an oil furnace carbon black having an average particle diameter between about 20 and about 30 millimicrons, an oil absorption factor of between about 110 lbs. and about 250 lbs./lb., a surface area between about 110 and about 220 m.$^2$/gram, and which has been heated to a temperature above about 500° C. in the absence of any substantial amounts of air and extruding the resulting dispersion into the final shape desired at about atmospheric pressure.

2. The process of claim 1 wherein said black is heated to a temperature between about 800° C. to about 1500° C. in the absence of any substantial amounts of air for from about 30 minutes to about 5 hours.

3. The process of claim 1 wherein there is dispersed into said polymeric substance a curing agent therefor.

4. A composition having improved processability properties, especially when processed into a final form at substantially atmospheric pressure, said composition comprising
    (a) a polymeric substance chosen from the group consisting of polyethylene, polypropylene, polybutene, copolymers thereof and mixtures thereof, and
    (b) an amount above about 2 parts per hundred parts by weight of said polymeric substance of a high structure oil furnace black having an average particle diameter between about 20 and about 30 millimicrons, an oil absorption factor of between about 110 to about 250 lbs./lb. of black, a surface area between about 110 to about 220 m.$^2$/gram and which has been heated to a temperature above about 500° C. in the absence of any substantial amounts of air.

5. The composition of claim 4 wherein said black has been heated to a temperature between about 800° C. to about 1500° C. in the absence of any substantial amounts of air for from about 30 minutes to about 5 hours.

6. The composition of claim 4 wherein said composition contains a curing agent for said polymeric substance.

References Cited

UNITED STATES PATENTS

| | | | |
|---|---|---|---|
| 2,888,424 | 5/1959 | Precopio et al. | 260—41 |
| 3,108,985 | 10/1963 | Weyer | 260—37 |
| 2,495,925 | 1/1950 | Foster et al. | 23—209.2 |

OTHER REFERENCES

Morton: Rubber Technology, Reinhold Corp., New York, 1959, TS 1890–M66 C5 (copy Gr. 150, p. 187 relied on).

Mantell: Industrial Carbon, 2nd ed., D. Van Nostrand Co., N.Y., 1946, TP 245–C4M3 (copy Gr. 110, pp. 64 and 66 relied on).

Studebaker: "The Chemistry of Carbon Black and Reinforcement," Rubber Chem. and Technol., 30, 1400, TS 1870 R75, 83 pp., December 1957, pp. 1402, 1410, 1419–1430 relied on.

MORRIS LIEBMAN, *Primary Examiner.*

ALEXANDER BRODMERKEL, JULIUS FROME,
*Examiners.*

K. B. CLARKE, J. S. WALDRON, S. L. FOX,
*Assistant Examiners.*